Figure 1:
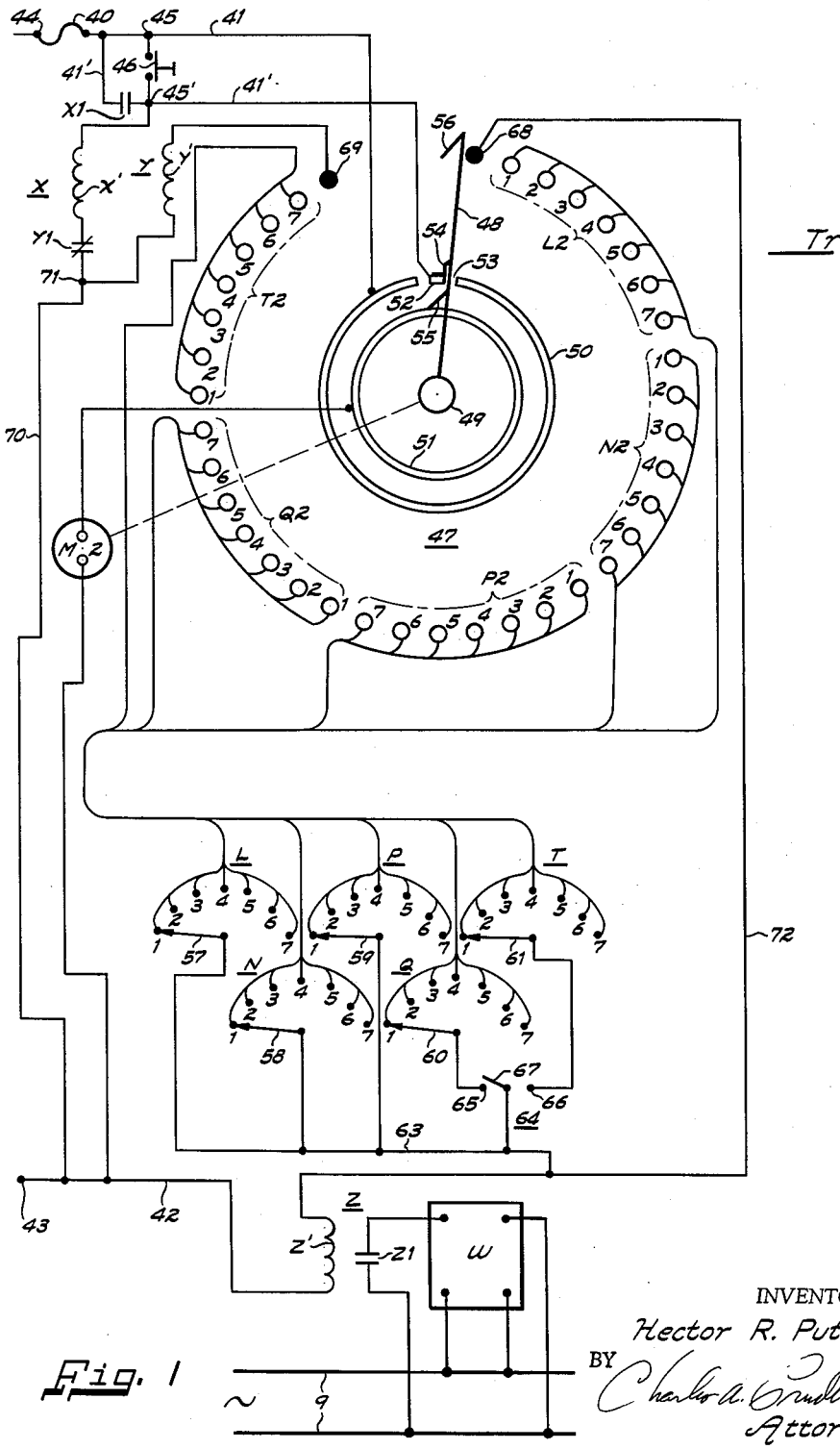

June 27, 1961 H. R. PUTZ 2,990,537
REMOTE CONTROL SYSTEM
Filed May 12, 1958 3 Sheets-Sheet 1

INVENTOR.
Hector R. Putz
BY Charles A. Grudell
Attorney

June 27, 1961  H. R. PUTZ  2,990,537
REMOTE CONTROL SYSTEM
Filed May 12, 1958  3 Sheets-Sheet 2

INVENTOR.
Hector R. Putz
BY Charles A. ...
Attorney

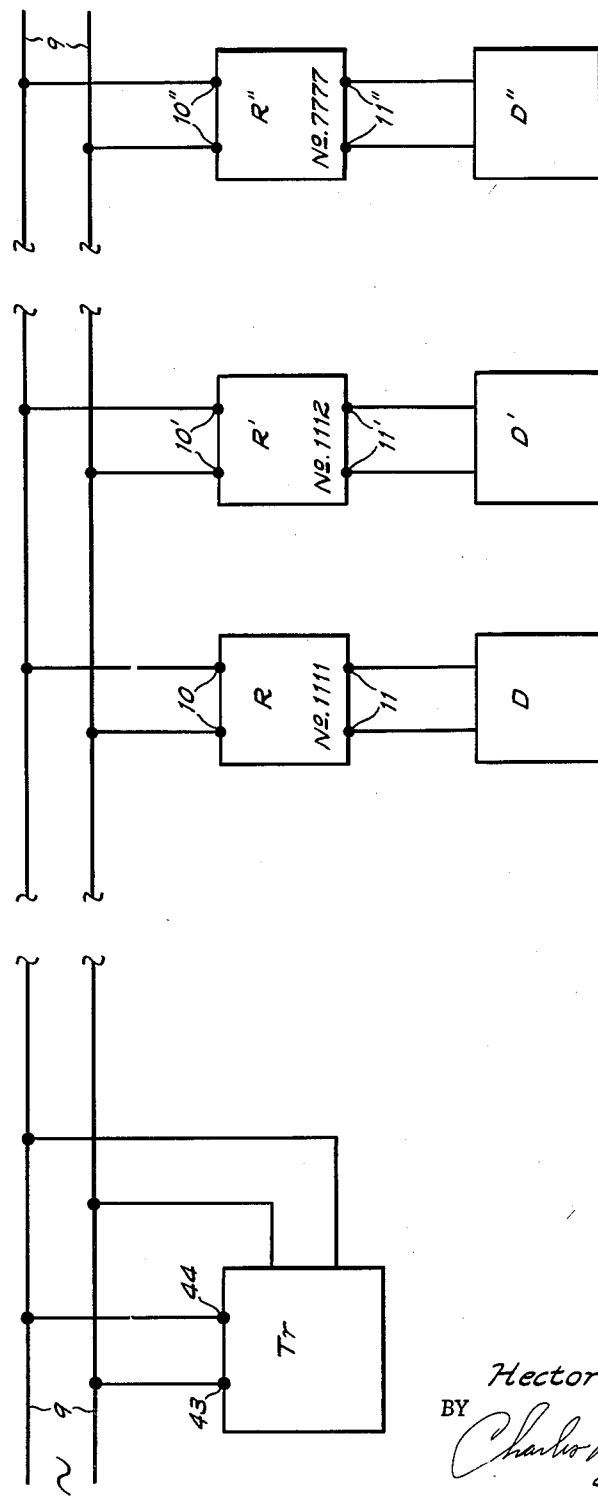

United States Patent Office 2,990,537
Patented June 27, 1961

2,990,537
REMOTE CONTROL SYSTEM
Hector Rawcliffe Putz, Toronto, Ontario, Canada, assignor to McGraw-Edison Company, Milwaukee, Wis., a corporation of Delaware
Filed May 12, 1958, Ser. No. 734,769
Claims priority, application Canada Sept. 13, 1957
3 Claims. (Cl. 340—147)

The invention relates to a system for individual control of a plurality of scattered units from a common point.

The invention is described in connection with a system for remotely controlling oil well pump motors, but it also has many other obvious applications.

The normal method for removing oil from wells is to equip each well with a pump feeding into a common pipe line. Each pump is switched on whenever it is desired to withdraw oil from the corresponding well. It has been common practice to include a time switch in the electrical controls of each pump to accomplish periodic pumping and inactive periods. This method has several obvious disadvantages among which is the necessity of frequently visiting each well to rewind the mechanism of the time switches if clock work is used, or to reset the mechanism in the event of power failure if it is of the synchronous motor type. If the program of oil removal is to be changed, each time switch must again be reset.

It is clearly advantageous therefore to provide a system which will allow independent control of each oil well from a central point.

A general object of this invention is to provide a novel system and method for selectively controlling, from a single station, a plurality of remotely located electrical devices, such as oil well pumps that are disposed about an oil field.

Another object of the invention is to provide a new and improved receiver adapted to receive signals from a remote transmitter and to utilize said signals in carrying out a control operation.

Achievement of the foregoing objects and other more specific objects will appear from time to time throughout the course of the ensuing specification.

The invention provides a remote control system which includes a transmitter of a timed sequence of signals, a plurality of devices to be controlled and a plurality of receivers, one being associated with each device. Each receiver includes a memory unit for said signals, switch means for coupling and uncoupling said receiver to said transmitter, switch operating means adapted to set the switch in the coupling and uncoupling position in a predetermined time sequence and means for producing an output signal from the receiver when the switch is in the coupling position in the same time sequence as the timed sequence of said generated signals.

Figure 2:
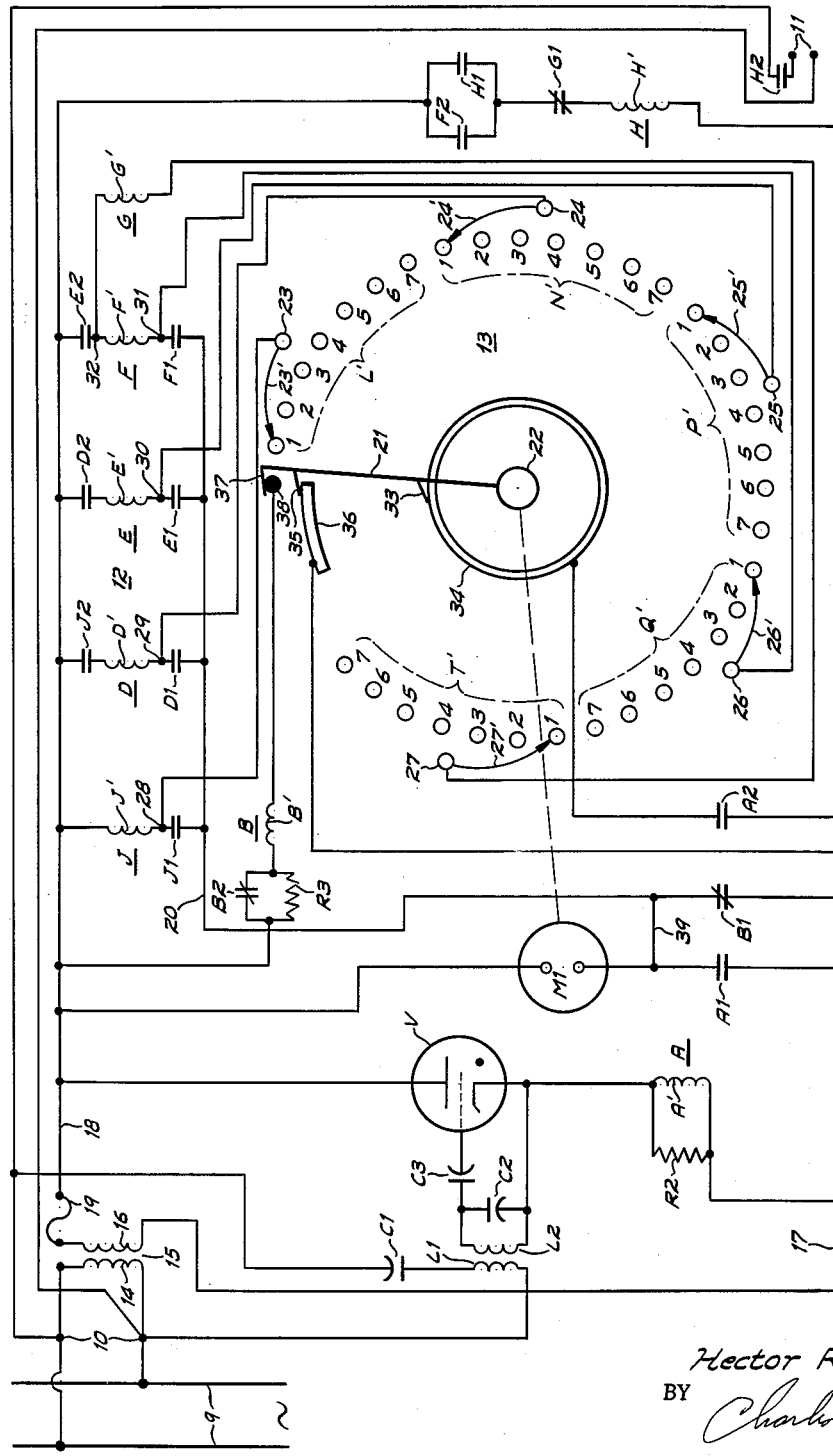

In the detailed description which follows, reference will be made to the drawings in which:

FIG. 1 is the circuit diagram of a suitable transmitter of control signals for the system in accordance with the invention; and FIG. 2 is the circuit diagram of a control unit in accordance with the invention; and FIG. 3 is a block diagram of a remote control system according to the invention.

FIG. 3 shows a remote control system embodying the invention and including a transmitter of a timed sequence of signals Tr, a plurality of devices to be controlled D, D' and D" and a receiver R, R' and R" associated with each device for receiving said timed sequence of signals and controlling its respective device in response thereto. In the embodiment of the invention illustrated, the control signal constitutes a carrier wave imposed on the power supply 9 common to all devices to be controlled.

FIG. 1 shows a suitable transmitter Tr for use in the system and includes a switching means 47 having a plurality of fixed contacts, a movable contact synchronously driven by motor M2 over said fixed contacts, and a plurality of selector switches L, N, P, Q and T, each associated with certain of said fixed contacts. By setting said selector switches in preselected positions, relay winding Z will be placed across power supply 9 through input terminals 43 and 44 each time the movable contact engages predetermined ones of said fixed contacts. The energization of winding Z' closes contacts Z1 thereby completing the input circuit from the line 9 to the impulse generator W resulting in an impulse being impressed on the normal frequency of the system power supply 9. Impulse generator W may be any suitable device well known in the art.

Referring now to the transmitter circuit in greater detail, input terminal 44 is connected through fuse 40 to conductor 41 and terminal 43 is connected directly with conductor 42. Contacts X1 of relax X are disposed in a second conductor 41' connected to terminal 44 in parallel with conductor 41. A press switch 46 is connected between points 45 and 45' on conductors 41 and 41' respectively, thereby shunting contacts X1. The winding X' of relay X has one terminal connected to junction 45' and the other terminal connected to one side of contacts Y1 of relay Y. The other side of contacts Y1 is connected to conductor 42 by means of conductor 70.

Switching means 47 schematically illustrated in FIG. 1 includes a wiper arm 48 rotatably mounted on shaft 49, a pair of slip rings 50 and 51 concentric with shaft 49 and a plurality of fixed contacts circumferentially disposed around shaft 49. The fixed contacts are separated into groups each having an equal number of contacts. In the preferred embodiment, the contacts are divided into groups designated L2, N2, P2, Q2 and T2 and each has seven contacts numbered 1 to 7. A stationary contact 52 is disposed in a small gap 53 in slip ring 50 and is electrically isolated from slip ring 50 by said gap. Wiper arm 48 has a first contact brush 54 which rests on contact 52 when wiper arm 48 is in the rest position as shown in FIG. 1, a second contact brush 55 which rests on slip ring 51, and a contact wiper 56 which is at the same radial distance from shaft 49 as the fixed contacts. When wiper arm 48 moves from the rest position, contact brush 53 will move off of contact 52 and onto slip ring 50, wiper 56 will sequentially engage the circumferentially disposed fixed contacts and contact brush 55 will remain in contact with slip ring 51. Conductor 41 is connected to slip ring 50 and conductor 41' is connected to contact 52 disposed in the gap 53 in slip ring 50. A synchronous motor M2 is electrically connected between slip ring 51 and conductor 42 and is mechanically connected to shaft 49 through suitable speed reduction means (not shown).

Each of the fixed contacts 1–7 of the groups L2, N2, P2, Q2 and T2 are connected by an individual conductor to a corresponding fixed contact of selector switches L, N, P, Q and T which are here shown as being manually operable. Selector switches L, N, P, Q and T each has a movable wiper 57, 58, 59, 60 and 61 respectively. Movable wipers 57, 58 and 59 of selector switches L, N and P respectively are directly connected to conductor 63, while movable wipers 60 and 61 of selector switches Q and T respectively may be individually connected to conductor 63 through selector switch 64 which has a first fixed contact 65 connected to wiper 60 of switch Q, a second fixed contact 66 connected to wiper 61 of switch T and movable contact 67 connected to conductor 63.

A pair of fixed contacts 68 and 69 not included in any of the groups L2, N2, P2, Q2 and T2 are disposed on either side of wiper 56 between said wiper and the fixed contacts of said group when said wiper is in the rest position shown in FIG. 1, whereby when wiper arm 48 moves clockwise from its rest position, contact 68 will be the first contact to be engaged by wiper 56 and contact 69 will be the last to be engaged thereby. Winding Y' of relay Y is connected between contact 69 and conductor 70 at a point 71 on said conductor which lies between contacts Y' of relay Y and the junction between conductor 70 and conductor 42. Fixed contact 69 is connected to conductor 63 by means of conductor 72. Winding Z' of relay Z has one terminal connected to the junction of conductors 63 and 72 and the other terminal connected to conductor 42. The contacts Z1 of relay Z are disposed in the input connection from one side of the system power supply 9 and one input terminal of impulse generator W. Thus, the energizing of winding Z' results in the completion of the input circuit to impulse generator W whereby a pulse is added to the normal system frequency through the output O of impulse generator W.

All relays are shown in the de-energized condition and contacts X1 and Z1 are open while contact Y1 is closed.

When it is desired to bring about a control action at one of the distant pumping stations the first three digits of the number of the distant controller are selected with switches L, N, and P respectively. Selection of the next digit is carried out with either switch Q or T depending upon the need to switch the distant equipment on or off and movable contact 67 of switch 64 is then thrown to the appropriate one of fixed contacts 65 or 66 to connect the chosen switch to wire 63. Assuming for the sake of illustration that the number of the receiver to be actuated is 1,111, then selector switches L, N, P, Q and T would be in the positions shown in FIG. 1.

The signal generator is started by pressing switch 46 to connect motor M2 between input terminals 43 and 44 through wire 41', fixed contact 52, contact brush 54, wiper arm 48, contact brush 55 and slip ring 51, whereby motor M2 starts and runs synchronously with the A.C. system frequency. At the same time current energizes winding X' through closed contacts Y1, resulting in the closing of contacts X1 so that operation may continue after release of switch 46. Brush 54 is sufficiently long with respect to gap 53 so that it will contact slip ring 50 before it has completely left fixed contact 52 whereby motor rotation may continue uninterrupted. The starting pulse for the remote receivers is initiated when wiper 56 engages fixed contact 68 thereby energizing relay Z. Similarly, during rotation of shaft 49 relay coil Z' will operate its contact Z1 and as a result a pulse of signalling frequency will be imposed by impulse generator W on the power lines 9 every time wiper 56 passes over a contact connected to wire 63 through selector switches L, N, P and Q or T. When 56 reaches contact 69 current flows through winding Y' thus opening contacts Y1 which breaks the circuit through winding X' and releases contacts X1. Contact 52 will then be de-energized and the motor will come to rest after brush 54 leaves slip ring 50 and contact brush 54 then lies on contact 52.

The receiving unit, shown schematically in FIG. 2 includes input terminals 10, output terminals 11, signal memory means 12 which is coupled to the output terminals 11 and which comprises relays J, D, E and F, switch means 13 electrically coupling the signal memory means to the input terminals 11, and switch operating means including motor M1. The switch means 13 includes a plurality of fixed contacts and a movable contact driven across said fixed contacts by motor M1.

Each of the relays is connected to certain of said fixed contacts whereby if a pulse is received at input terminals 10 from the transmitter shown in FIG. 1, when the movable contact engages a fixed contact to which one of the relays is connected, said relay will be closed. If each of the relays is actuated in this manner, the receiver will open or close contacts H2 disposed in between input terminals 10 and output terminals 11, whereby a device to be controlled which is connected to output terminals 11 will be either energized or de-energized depending on the setting of the transmitter of FIG. 1.

Referring now to FIG. 2 in greater detail, input terminals 10 are connected to the local power supply 9 and are shunted by a condenser C1 and a coil L1 connected in series. A second coil L2 magnetically coupled to L1 is shunted by a second condenser C2. One side of capacitor C2 is connected to the cathode of a cold cathode gas filled triode V and the other side thereof is coupled by means of a third capacitor C3 to the control grid of triode V. Input 10 is also bridged by the high voltage winding 14 of step down transformer 15. One side of the low voltage secondary winding 16 of transformer 15 is connected to bus bar 17 and the other side is connected to a second bus bar 18 through fuse 19. The anode of triode V is connected to bus bar 18 and the cathode is connected to bus bar 17 through the parallel combination of winding A' of relay A and resistance R2. One side by synchronous motor M1 is connected to bus bar 18 and the other side is connected through contacts A1 of relay A to bus bar 17. One side of winding J' of relay J is connected to bus bar 18 and the other side thereof is connected to a common conductor 20 through contacts J1 of relay J. Windings D' of relay D, E' of relay E, and F' of relay F are connected through contacts J2 of relay J, D2 of relay D and E2 of relay E respectively, to bus bar 18. The other sides of windings D', E' and F' are connected to conductor 20 through contacts D1, E1 and F1 respectively. Conductor 20 is connected to bus bar 17 through contacts B1 of relay B. Conductor 39 connects the junction between motor M1 and contacts A1 of relay A to the junction between contacts B1 and conductor 20.

Switch means 13 includes a wiper arm 21 rotatably mounted on shaft 22 which is mechanically coupled to motor M1 through suitable speed reducing means (not shown) and a plurality of fixed contacts circumferentially spaced around shaft 22 and equidistant therefrom. The fixed contacts are arranged in groups, each group having an equal number of contacts, the number of groups and the number of contacts in each group corresponding to those of the transmitter shown in FIG. 1. In the preferred embodiment the contacts are divided into groups designated L', N', D', Q' and T', each having seven contacts. One of the terminals 23, 24, 25, 26 and 27 is respectively associated with one of the groups of fixed contacts L', N', P', Q' and T' and each of the terminals has a flexible lead 23', 24', 25', 26' and 27', which may be selectively connected to one of the fixed contacts of the group with which its respective terminal is associated. Junction 28 between winding J' and contacts J1 is connected to terminal 23. Similarly junction 29 between winding D' and contacts D1, junction 30 between winding E' and E1, junction 31 between winding F' and contacts F1 and junction 32 between winding F' and contacts E2 are connected to terminals 24, 25, 26 and 27 respectively. Winding G' of relay G is electrically disposed in the connection between junction 32 and terminal 27. Winding H' of relay H, contacts G1 of relay G and the parallel combination of contacts H1 of relay H and F2 of relay F are serially connected between bus bars 17 and 18. Contacts H2 of relay H are disposed in the connection between output terminals 11 and input terminals 10.

Wiper arm 21 includes a first contact brush 33 which is in continuous engagement with a slip ring 34 concentrically disposed around shaft 22, a second contact brush 35 which engages the edge of a contact segment 36 when wiper arm 21 is in the rest position shown in FIG. 2 and a contact wiper 37 which is disposed at the same distance from shaft 22 as the fixed contacts. When wiper 21 is in the rest position shown in FIG. 1, contact wiper 37 engages fixed contact 38 not associated with any of the groups of fixed contacts heretofore discussed. Contact 38 is connected to bus bar 18 through the serially connected combination of winding B' and contacts B2, said contacts being shunted by resistor R3. Slip ring 34 is connected to bus bar 17 through contacts A2 of relay A and segment 36 is directly connected to said bus bar.

When the receiver is in the de-energized condition, contacts B1, B2 and G1 are closed, all other contacts being open. Upon the application of system power to input terminals 10, winding B' of relay B is energized through a path defined by bus bar 18, resistor R3, contact 38, wiper 37, brush 35, segment 36 and bus bar 17, thereby opening contacts B1 and B2.

When a signalling pulse from transmitter W is injected into the power supply 9, this pulse will appear superimposed upon the normal system frequency at input terminals 10. This pulse is differentiated from the system frequency by the filter circuit consisting of capacitor C1, inductor L1 and resonant circuit of inductor L2 and capacitor C2. The filter circuit passes the pulse which appears as an alternating voltage across the grid and cathode of the cold cathode triode V. The striking voltage of the triode is chosen so that discharge will not normally be set up by the peak positive voltage appearing between its anode and cathode due to the normal system voltage on bus bars 17 and 18. However, when a filtered pulse appears between the cathode and grid of triode V the positive direction swings of the grid due to the pulse are arranged to be sufficiently large to cause triode V to strike during the half cycle when the anode is positive with respect to the cathode. The triode will then strike on each positive half cycle of main voltage between 17 and 18 as long as the pulse persists. These pulses of current flowing through triode V energize winding A' which closes contacts A1 and A2. The shunting resistor R2 prevents excessive current from flowing in A', and also prevents chattering of the relay contacts A1 and A2 which would otherwise be present due to the half wave rectified current passing through winding A' and triode V.

When the transmitter shown in FIG. 1 is actuated, wiper 56 engages contact 69 and the first signal is injected into the system power supply 9 in the manner heretofore described in connection with FIG. 1. This impulse closes contacts A1 in FIG. 2 and starts motor M1 which runs synchronously with the system frequency. Similarly, the synchronous motors of all other receivers in the system are also started. The rotation of shaft 22 causes wiper 37 to leave fixed contact 38 thereby de-energizing relay B which closes contacts B1 thereby completing the circuit through motor M1 independent of relay A. The first pulse finishes shortly after wiper 33 leaves contact 38.

Assuming for the sake of illustration that the number of the receiver illustrated is 1,111 flexible leads 23', 24', 25', 26' and 27' are placed on the first contact of each of their respective groups. The flexible leads on the next receiver would be set on contacts 1,112 and so forth up to a possible 7,777. Because motors M1 of the receiver and M2 of the transmitter are in synchronism with the system frequency, wiper 37 of the receiver will engage the contacts in groups L', N', P', Q' and T' at the same time that wiper 56 of the transmitter engages the corresponding contacts of groups L2, N2, P2, Q2 and T2. If the transmitter is set so as to actuate controller 1,111 whereby movable contacts 57, 58, 59, 60 and 61 of selector switches L, N, P, Q and T are in the positions shown in FIG. 1, the receiver will receive a pulse each time wiper 37 engages the first contact of each of the groups L', N', and P' and either Q' or T' depending on the position of switch 65 in FIG. 1. If a pulse is received as wiper 33 meets contact 1 of the first group of circumferentially disposed contacts L', relay A will be energized closing contacts A2 thereby completing the circuit between bus bars 17 and 18 through winding J', terminal 23, lead 23', wiper 37, wiper arm 21, brush 33, slip ring 34 and contacts A2. Relay J will be actuated closing contacts J1 and J2 thereby placing winding J' directly between bus bars 17 and 18 through contacts J1 and B1 and connecting one side of winding D' to bus bar 18 through contacts J2. As the rotation of shaft 22 continues a pulse is again received as contact 1 of group N' is engaged by wiper 37 whereby the circuit between bus bars 17 and 18 through winding D will be completed in a similar manner, closing contacts D1 and D2. When wiper 37 engages contact 1 of group P', winding E' will be similarly actuated closing contacts E1 and E2.

If it is desired to start the equipment being controlled, movable contact 67 of generator selector switch 64 is placed on fixed contact 65 whereby a pulse is received as wiper 37 engages contact 1 of group Q'. This completes the circuit between bus bars 17 and 18 through winding F' and contacts F1 and F2 of relay F are closed thereby energizing winding H' of relay H which closes contacts H1 and H2. The closing of contacts H2 results in the voltage across input terminals 10 to be applied to output terminals 11 thereby energizing any equipment connected to these terminals. No further pulses are transmitted and the wiper 37 passes over contacts of group T'. When brush 35 meets segment 36, wiper 37 becomes effectively connected to bus bar 17 and as rotation of shaft 22 continues, wiper 37 engages contact 38 energizing winding B' of relay B thereby opening contacts B1 which brings the motor to rest and releases relays J, D, E and F. The equipment is then ready to begin another cycle upon reception of another pulse. Winding H' of relay H, however, remains energized through contacts H1 whereby output terminals 11 remain connected to input terminals 10 through contacts H2.

Since the motors of each receiver run synchronously with motor M2 of the transmitter, the next succeeding receiver, which has its flexible leads set on contacts 1,112, will have its relays J, D and E also energized because impulses will be received when its wiper 37 engages the first fixed contact of each of its groups L', N' and P'. However, since no pulse is transmitted when the wiper of this receiver engages the second fixed contact of group Q', relay F' will not be actuated and the device connected to this receiver will not be energized. It can thus be seen that only a preselected one of a large number of receivers will be actuated by the transmitter for any given setting of selector switches L, N, P, Q and T.

When it is desired to switch off the power supply to the device connected to output terminals 11, movable wiper 67 of switch 64 of the transmitter is moved to contact 66 and push button 46 is actuated. The first three relays J, D and E of the controller are closed in the same manner as heretofore described. However, this time a pulse will be received when wiper 37 engages the first contact of group T' rather than when it engages the first contact of group Q' whereby a connection between bus bars 17 and 18 is completed through winding G' and closed contacts E2. The operation of relay G opens contacts G1, releasing relay H by breaking the circuit through winding H'. This opens contacts H2 thus removing the voltage supply between output terminals 11.

It will be seen that relays J, D, E, F and G form a signal memory means for recording the signals received when wiper 37 engages certain of the fixed contacts. It will be clear that other types of signal memory devices may be substituted for the one disclosed without departing from the spirit of the invention. Also, a simple "on" "off" switch for feeding said signal memory means may be substituted for the rotary switch shown if suitable switch operating means is provided to assure that the signal memory means is energized in a predetermined timed sequence.

In any particular system a plurality of receiver units will be employed each having its respective flexible leads on the contacts corresponding to the number of the unit. Because the motors of each controller are connected to the local power supply, the contact arms of each will be driven over its fixed contacts in synchronism with wiper 56 and each motor will be actuated when wiper 56 of the transmitter engages contact 68. Only that receiver whose setting of the flexible leads corresponds to that of the transmitter wiper positions will have all of its relays J, D, E and one of F or G actuated, whereby only that unit will operate its device to be controlled.

The descriptions given above have been referred to a system for controlling merely "on" "off" switching of the controlled device but it will be obvious that by providing further digits any number of intermediate running positions could be achieved. Similarly any desired number of remotely controlled devices might be provided. It will be appreciated that it is not essential that transmitter and receiver be synchronized by motors connected to the same power system. The emission of a radio carrier could, for instance, be made equally effective for synchronizing the relay selector means in the receiver for obvious electronic equivalents of the motor driven rotary switch.

I claim:

1. For use in a system having a transmitter of a timed sequence of signals, a receiver having a pair of input terminals adapted to be connected to said transmitter and a pair of output terminals, a first one of said input terminals being connected to a first one of said output terminals, a plurality of serially operable relay means each having a winding, switching means having a movable contact sequentially engageable with one side of each of said windings in a predetermined timed sequence, means responsive to said signals for connecting said movable contact to one of said input terminals, each relay having a first contact means for connecting said one side of said windings to said one input terminal, the other side of the first winding to be sequentially coupled by said switching means being connected to the other input terminal, each relay except the last to be coupled having a second contact means for connecting the other input terminal to the other side of the next succeeding relay winding to be coupled by said switching means, the last relay to be coupled having a contact means for connecting said other input terminal to the other output terminal, whereby said plurality of relays will be serially energized to connect said input terminals to said output terminals if the predetermined time sequence that said coupling means couples the one side of said relay windings to said one input terminal is the same as the time sequence of said signals from the transmitter.

2. For use in a system having a transmitter of a timed sequence of signals, a receiver having a pair of input terminals adapted to be connected to said transmitter and to a source of electrical energy, a pair of output terminals, a first one of said input terminals being connected to a first one of said output terminals, a series of relay means each having a winding, switching means operable to sequentially engage a first side of each of said windings in a predetermined time sequence, means responsive to said signals for connecting said movable contact to one of said input terminals, each of said relays having a first contact for connecting the said first side of its respective winding to said one input terminal, the second side of the first winding in said series being connected to the other input terminal, each of the relays except the last in said series having a second contact means for connecting the second side of the next succeeding winding in said series to the other input terminal, the last relay in said series having a contact means for connecting the second one of said input terminals to the second one of said output terminals, whereby said input terminals will be connected to said source of electrical energy if the predetermined time sequence of said switching means is the same as the time sequence of said signals from said transmitter, and de-energizing relay means connected to said switching means for open circuiting each of said relay windings after the last relay winding in said series has been engaged by said switch means.

3. For use in a system having a transmitter of a timed sequence of signals, a receiver having a pair of input terminals adapted to be connected to said transmitter and to a source of electrical energy, a pair of output terminals, a first one of said output terminals being connected to a first one of said input terminals, a series of signal responsive relay means each having a winding, switching means having a movable contact sequentially engageable with a first side of each of said windings in a predetermined timed sequence, means responsive to said signals for connecting said movable contact to one of said input terminals, each relay except the last in said series having a first contact means for connecting said first side of its respective winding to said one input terminal, the second side of the first winding in said series being connected to the other input terminal, each of the relays except the last two in said series having a second contact means for connecting the second side of the next succeeding relay winding in said series to the other input terminal, the second side of the last relay winding being connected to the second side of one of the other relay windings, an output relay having one side of its winding connected to one of said input terminals and a pair of normally opened contacts for connecting the other side of its winding to the other input terminal, the second last of said signal responsive relays having a pair of normally opened contacts in parallel with the normally open contacts of said output relay, the last signal responsive relay having a pair of normally closed contacts in series with said output relay winding, said output relay having a pair of normally open contacts for connecting the second input terminal to the second output terminal.

References Cited in the file of this patent

UNITED STATES PATENTS

| Re. 17,797 | Chase et al. | Sept. 16, 1930 |
| 2,203,358 | Koenig | June 4, 1940 |
| 2,229,097 | Koenig | Jan. 21, 1941 |
| 2,480,624 | Barnard et al. | Aug. 30, 1949 |
| 2,514,889 | McGoffin | July 11, 1950 |
| 2,563,127 | McGoffin | Aug. 7, 1951 |
| 2,589,130 | Potter | Mar. 11, 1952 |

FOREIGN PATENTS

| 495,057 | Great Britain | Nov. 7, 1938 |